United States Patent [19]

Robert et al.

[11] Patent Number: 4,937,863

[45] Date of Patent: Jun. 26, 1990

[54] SOFTWARE LICENSING MANAGEMENT SYSTEM

[75] Inventors: Gregory Robert, Nashua, N.H.; David Chase, Wellesley; Ronald Schaefer, Acton, both of Mass.

[73] Assignee: Digital Equipment Corporation, Maynard, Mass.

[21] Appl. No.: 164,944

[22] Filed: Mar. 7, 1988

[51] Int. Cl.⁵ .................................................. H04L 9/00
[52] U.S. Cl. ............................................. 380/4; 380/25
[58] Field of Search ................................. 380/4, 23, 25

[56] References Cited

U.S. PATENT DOCUMENTS

| | | |
|---|---|---|
| 4,677,434 | 6/1987 | Fascenda ............................. 380/23 |
| 4,740,890 | 4/1988 | William ................................. 380/4 |
| 4,791,565 | 12/1988 | Dunham et al. ....................... 380/4 |
| 4,796,181 | 1/1989 | Wiedemer .............................. 380/4 |

Primary Examiner—Thomas H. Tarcza
Assistant Examiner—David Cain
Attorney, Agent, or Firm—Fish & Richardson

[57] ABSTRACT

A license management system which includes a license management facility that determines whether usage of a licensed program is within the scope of the license. The license management system maintains a license unit value for each licensed program and a pointer to a table identifying an allocation unit value associated with each use of the licensed program. In response to a request to use a licensed program, the license management system respond with an indication as to whether the license unit value exceeds the allocation unit value associated with the use. Upon receiving the response, the operation of the licensed program depends upon policies established by the licensor.

13 Claims, 8 Drawing Sheets

LICENSE UNIT TABLE 40

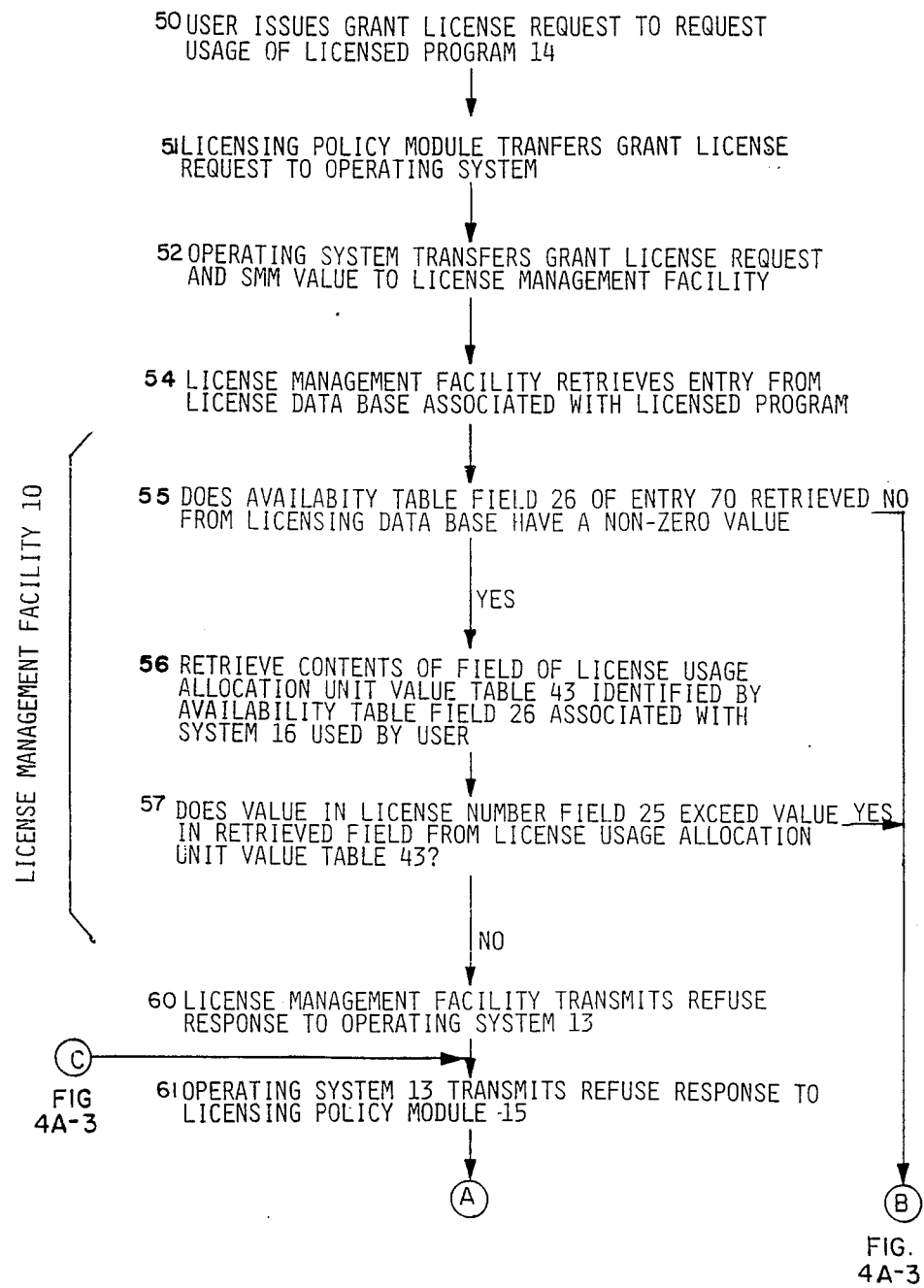

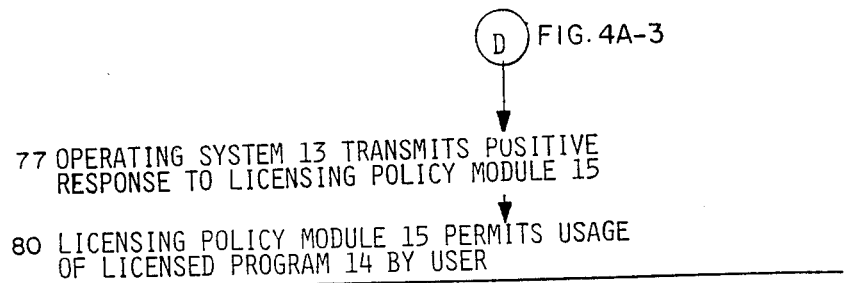

FIG. 4A-4

77 OPERATING SYSTEM 13 TRANSMITS POSITIVE RESPONSE TO LICENSING POLICY MODULE 15

80 LICENSING POLICY MODULE 15 PERMITS USAGE OF LICENSED PROGRAM 14 BY USER

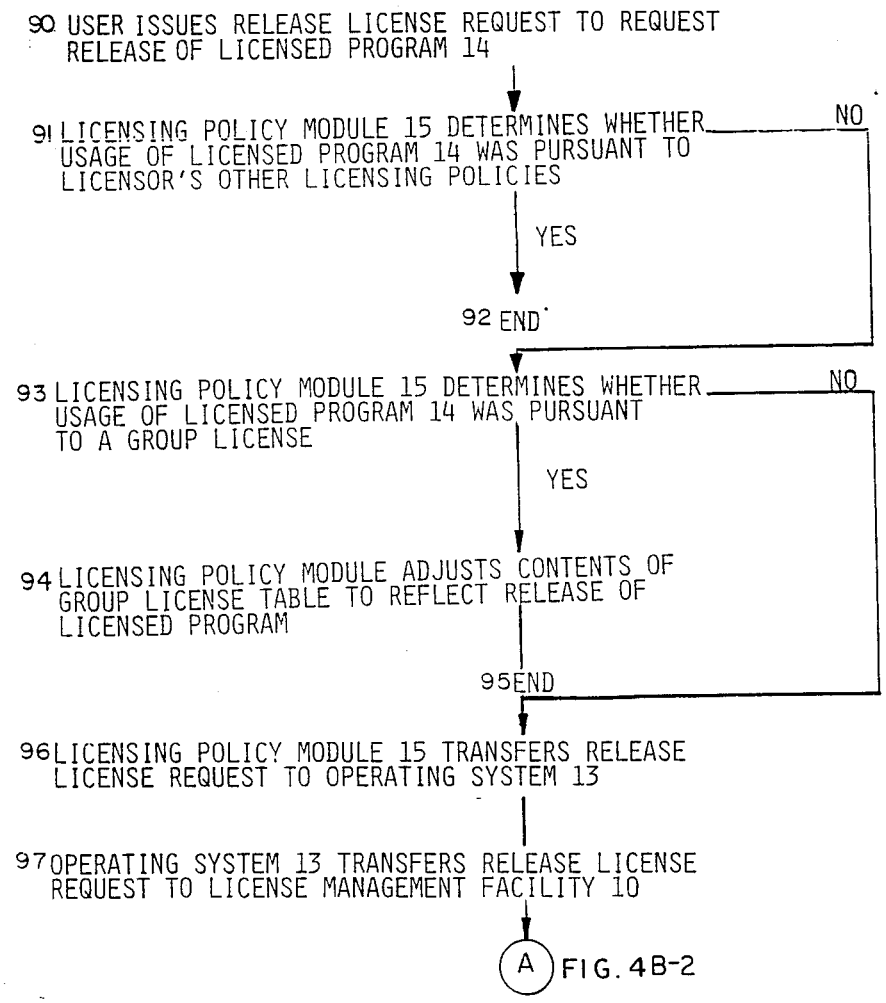

FIG. 4B-1
RELEASE LICENSE

90 USER ISSUES RELEASE LICENSE REQUEST TO REQUEST RELEASE OF LICENSED PROGRAM 14

91 LICENSING POLICY MODULE 15 DETERMINES WHETHER USAGE OF LICENSED PROGRAM 14 WAS PURSUANT TO LICENSOR'S OTHER LICENSING POLICIES — NO

92 END

93 LICENSING POLICY MODULE 15 DETERMINES WHETHER USAGE OF LICENSED PROGRAM 14 WAS PURSUANT TO A GROUP LICENSE — NO

94 LICENSING POLICY MODULE ADJUSTS CONTENTS OF GROUP LICENSE TABLE TO REFLECT RELEASE OF LICENSED PROGRAM

95 END

96 LICENSING POLICY MODULE 15 TRANSFERS RELEASE LICENSE REQUEST TO OPERATING SYSTEM 13

97 OPERATING SYSTEM 13 TRANSFERS RELEASE LICENSE REQUEST TO LICENSE MANAGEMENT FACILITY 10

(A) FIG. 4B-2

SOFTWARE LICENSING MANAGEMENT SYSTEM

BACKGROUND OF THE INVENTION

1. Field of the Invention

The invention relates generally to the field of digital data processing systems, and more specifically to a system for managing licensing for, and usage of, the various software programs which may be processed by the systems to ensure that the software programs are used within the terms of the software licenses.

2. Description of the Prior Art

A digital data processing system includes three basic elements, namely, a processor element, a memory element and an input/output element. The memory element stores information in addressable storage locations. This information includes data and instructions for processing the data. The processor element fetches information from the memory element, interprets the information as either an instruction or data, processes the data in accordance with the instructions, and returns the processed data to the memory element for storage therein. The input/output element, under control of the processor element, also communicates with the memory element to transfer information, including instructions and data to be processed, to the memory, and to obtain processed data from the memory.

Typically, an input/output element includes a number of diverse types of units, including video display terminals, printers, interfaces to the public telecommunications network, and secondary storage subsystems, including disk and tape storage devices. A video display terminal permits a user to run programs and input data and view processed data. A printer permits a user to obtain a processed data on paper. An interface to the public telecommunications network permits transfer of information over the public telecommunications network.

The instructions processed by the processor element are typically organized into software programs. Recently, generation and sales of software programs have become significant businesses both for companies which are primarily vendors of hardware, as well as for companies which vend software alone. Software is typically sold under license, that is, vendors transfer copies of software to users under a license which governs how the users may use the software. Typically, software costs are predicated on some belief as to the amount of usage which the software program may provide and the economic benefits, such as cost saving which may otherwise be incurred, which the software may provide to the users. Thus, license fees may be based on the power of the processor or the number of processors in the system, or the number of individual nodes in a network, since these factors provide measures of the number of users which may use the software at any give time.

In many cases, however, it may also be desirable, for example, to have licenses and license fees more closely relate to the actual numbers of users which can use the program at any given time or on the actual use to which a program may be put. Furthermore, it may be desirable to limit the use of the program to specified time periods. A problem arises particularly in digital data processing systems which have multiple users and/or multiple processors, namely, managing use of licensed software to ensure that the use is within the terms of the license, that is, to ensure that the software is only used on identified processors or by the numbers of users permitted by the license.

SUMMARY OF THE INVENTION

The invention provides a new and improved licensing management system for managing the use of licensed software in a digital data processing system.

In brief summary, the license management system includes a license management facility and a licensing policy module that jointly determine whether a licensed program may be operated. The license management facility maintains a license unit value for each licensed program and a pointer to a table identifying a license usage allocation unit value associated with usage of the licensed program. In response to a request to use a licensed program, the license management facility determines whether the remaining license unit value exceeds the license usage allocation unit value associated with the use. If the license unit value does not exceed the license usage allocation unit value, the license management facility permits usage of the licensed program and adjusts the license unit value by a function of the license usage allocation unit value to reflect the usage. On the other hand, if the license unit value associated with use of the license program does exceed the license usage allocation unit value, the licensing policy module determines whether to allow the licensed program to be used in response to other licensing policy factors.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4A-1 through 4B-2 are flow diagrams which are useful in understanding the detailed operations of the system depicted in FIG. 1.

DETAILED DESCRIPTION OF AN ILLUSTRATIVE EMBODIMENT

Figure 1:
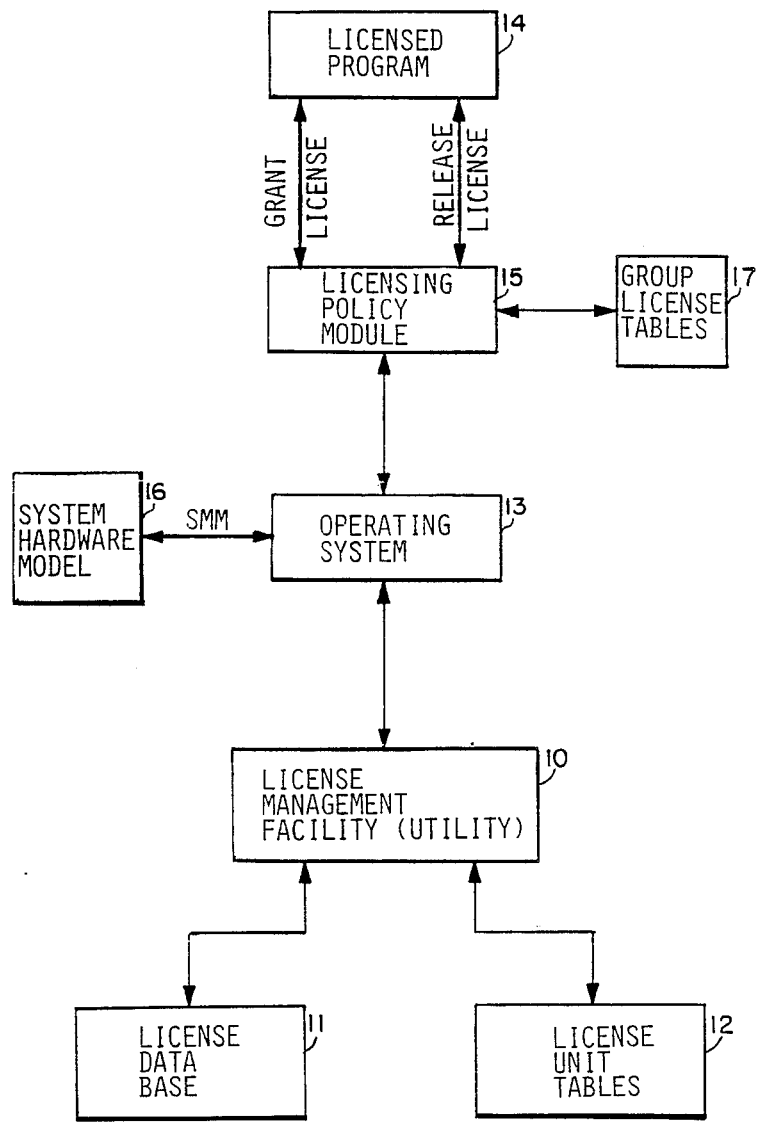
FIG. 1 is a general block diagram of a new system in accordance with the invention.

FIG. 1 depicts a general block diagram of a system in accordance with the invention for use in connection with a digital data processing system which assists in managing software use in accordance with software licenses. With reference to FIG. 1, the new system includes a license management facility 10 which operates in conjunction with a license data base 11 and license unit tables 12, and under control of an operating system 13 and licensing policy module 15 to control use of licensed programs, such as licensed program 14, so that the use is in accordance with the terms of the software license which controls the use of the software program on a system 16 identified by a system marketing model (SMM) code in a digital data processing system.

As is conventional, the digital data processing system including the licensing management system may include one or more systems 16, each including one or more processors, memories and input/output units, interconnected in a number of ways. For example, the digital data processing system may comprise one processor, which may include a central processor unit which controls the system and one or more auxiliary processors which assist the central processor unit. Alternatively, the digital data processing system may comprise multiple processing systems, in which multiple central processor units are tightly coupled, or clustered or networked systems in which multiple central processor units are loosely coupled, generally operating relatively autonomously, interacting by means of messages transmitted over a cluster or network connection. In a tightly coupled multiple processing system, for example, it may be desirable to control the number of users which may use a particular software program at one time. A similar restriction may be obtained in a cluster or network environment by controlling the number of particular nodes, that is, connections to the communications link in the cluster or network over which messages are transferred. In addition, since the diverse processors which may be included in a digital data processing system may have diverse processing speeds and powers, represented by differing system marketing model (SMM) codes, it may be desirable to include a factor for speed and power in determining the number of processors on which a program may be used concurrently.

As will be explained in greater detail below, the license data base 11 contains a plurality of entries 20 (described below in connection with FIG. 2) each containing information relating to the terms of the license for a particular licensed program 14. In one embodiment such information may include a termination date, if the license is for a particular time period or expires on a particular date, and a number of licensing units if the license is limited by usage of the license program. In that embodiment, the entry also includes identification of a license unit table 40 (described below in connection with FIG. 3) in the license unit tables 12 that identifies the number of allocation units for usage of the licensed program on the types of systems 16 which may be used in the digital data processing system as represented by the system marketing model (SMM) codes.

When a user wishes to use a licensed program 14, a GRANT LICENSE request message is generated which requests information as to the licensing status of the licensed program 14. The GRANT LICENSE request message is transmitted to the licensing policy module 15, which notifies the operating system of the request. The operating system 13, in turn, passes the request, along with the system marketing model of the specific system 16 being used by the user, to the license management facility 10 which determines whether use of the program is permitted under the license.

In response to the receipt of the GRANT LICENSE request from the user and the system marketing model (SMM) code of the system 16 being used by the user on which the licensed program will be processed, the license management facility 10 obtains from the license data base the entry 20 associated with the licensed program 14 and determines whether the use of the licensed program 14 is within the terms of the license as indicated by the information in the license data base 11 and the license unit tables 12.

In particular, the license management facility 10 retrieves the contents of the entry 20 associated with the licensed program. If the entry 20 indicates a termination date, the license management facility 10 compares the system date, which is maintained by the digital data processing system in a conventional manner, with the termination date identified in the entry. If the system date is after the termination date identified in the entry 20, the license has expired and the license management facility 10 generates a usage disapproved message, which it transmits to the operating system 13. On the other hand, if the termination date indicated in the entry 20 is after the system date, the license has not expired and the license management facility 10 proceeds to determine whether the usage of the licensed program 14 is permitted under other terms of the license which may be embodied in the entry 20.

In particular, the license management facility 10 then determines whether the usage of the licensed program is permitted under usage limitations. In that operation, the license management facility obtains the number of license units remaining, which indicates usage of the licensed program 14 not including the usage requested by the user, as well the identification of the table 40 in license unit tables 12 associated with the licensed program 14. The license management facility 10 then compares the number of license units which would be allocated for use of the licensed program 14, which it obtains from the table 40 identified by entry 20 in the license data base 11, and the number of remaining license units to determine whether sufficient license units remain to permit usage of the licensed program 14.

If the number of remaining license units indicated by entry 20 in the licensed data base 11 exceeds the number, from license unit tables 12, of license units which would be allocated for use of the licensed program 14, the usage of the licensed program is permitted under the license. Accordingly, the license management facility transmits a usage approved response to the operating system 13. In addition, the license management facility 10 adjusts the number of remaining license units in entry 20 by a function of the license units allocated to use of the licensed program to reflect the usage.

On the other hand, if the number of remaining license units indicated by entry 20 in the license data base is less than the number of license units which would be allocated for use of the licensed program 14, the usage of the licensed program 14 is not permitted by the license. In that case, the license management facility 10 transmits a usage disapproved response to the operating system 13. In addition, the license management facility 10 may also log the usage disapproved response; this information may be used by a system operator to determine whether usage of the licensed program 14 is such as to warrant obtaining an enlarged license.

Upon receipt of either a usage approved response or a usage disapproved response to the GRANT LICENSE request, the operating system 13 passes the response to the licensing policy module 15. If a usage approved response is received, the licensing policy module normally allows usage of the licensed program 14. If a usage disapproved response is received, the licensing policy module determines whether the usage of the licensed program may be permitted for other reasons. For example, usage of the licensed program 14 may be permitted under a group license, whose terms are embodied in entries in group license tables 17. Under a group license, usage may be permitted of any of a group of licensed programs. The operations to determine to whether usage is permitted may be performed in the same manner as described above in connection with license management facility 10. In addition, if the usage of the licensed program 14 is not permitted under a group license, usage may nonetheless be permitted under the licensor's licensing practices, which may be embodied in the licensing policy module 15. If the licensing policy module determines that usage of the program should be permitted, notwithstanding a usage disapproved response from the license management facility 10, because the usage is permitted under a group license or the licensor's licensing practices, the licensing policy module 15 permits usage of the licensed program. Otherwise, the licensing policy module does not permit usage of the licensed program in response to the GRANT LICENSE request.

charge When a user no longer requires use of a licensed program 14, it transmits a RELEASE LICENSE request to the licensing policy module 15. The operations performed by the licensing policy module depend on the basis for permitting usage of the licensed program. If usage was permitted as a result of a group license, if the group license is limited by usage, the licensing policy module 15, if necessary, adjusts the records in the group license tables 17 related to the group license to reflect the fact that the licensed program 14 is not being used. If the usage was permitted as a result of a group license which is not limited by usage, but instead is limited in duration, or if the usage was permitted in response to the licensor's licensing policies, the licensing policy module 15 need do nothing. If the licensing policy module 15 maintains a log of usage outside the scope of a group or program license, it may make an entry in the log of the RELEASE LICENSE request.

Finally, if usage was permitted as a result of the license management facility 10 providing an approve usage response to the GRANT LICENSE request, the licensing policy module 15 transmits the RELEASE LICENSE request to the operating system 13. In response, the operating system 13 transfers the RELEASE LICENSE request to the license management facility 10, along with an identification of the system 16 using the licensed program 14. The license management facility 10 then obtains from the license data base the identification of the appropriate license usage allocation unit value table in license unit tables 12, and determines the number of allocation units associated with this use of the licensed program 14 based on the identified allocation table and the processor. The license management facility 10 then adjusts the number of license units for the licensed program 14 in the license data base 11 to reflect the release.

It will be appreciated by those skilled in the art that, the license management facility 10 may, in response to a GRANT LICENSE request, instead of deducting allocation units from the entries in the license data base 11 associated with the licensed programs 14, determine the number of allocation units which would be in use if usage of the licensed program 14 is permitted, and respond based on that determination. If the license management facility 10 operates in that manner, it may be advantageous for the entries in license data base 11 relating to each licensed program 14 to maintain a running record of the number of allocation units associated with its usage. The licensing policy module 15 may operate similarly in connection with group licenses that are limited by usage.

It will also be appreciated that the new license management system thus permits the digital data processing system to control use of a licensed program 14 based on licensing criteria in the license data base 11, the license unit tables 12, the group licensing tables 17 and the licensor's general licensing policies rather than requiring an operator to limit or restrict use of a licensed program or charging for the license based on some function of the capacity of all of the processors in the digital data processing system. The new license management system allows for very flexible pricing of licenses and licensing policies, since the digital data processing system itself enforces the licensing terms controlling use of the licensed programs 14 in the system.

Figure 2:
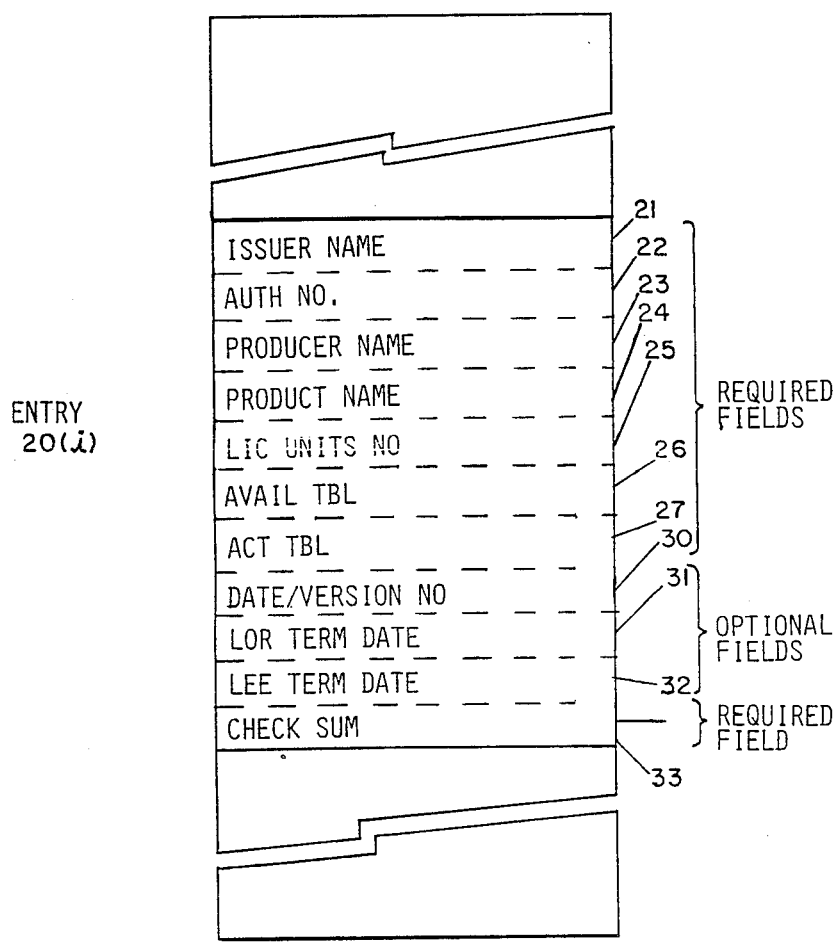
FIGS. 2 and 3 are diagrams of data structures useful in understanding the detailed operation of the system depicted in FIG. 1.

FIG. 2 depicts the detailed structure of the license data base 12 (FIG. 1) used in the license management system depicted in FIG. 1. With reference to FIG. 2, the license data base includes a plurality of entries generally identified by reference numeral 20, with each entry being associated with one licensed program 14. Each entry 20 includes a number of fields, including an issuer name field 21 identifying the issuer of the license, an authorization number field 22 which contains an authorization number, a producer name field 23 which identifies the name of the vendor of the licensed program, and a product name field 24 which contains the name of the licensed program. The contents of these fields may be used, for example, in connection with other license management operations, such as determining the source of licensed programs in the event of detection of errors in programs, and in locating duplicate entries in the license data base or entries which may be combined as a result of licenses being obtained and entered by, perhaps different operators or at different times.

Each entry 20 in the licensing data base 11 also includes a license number field 25 whose contents identify the number of licensing units remaining. A license of a licensed program 14 identifies a number of licensing units, which may be a function of the price paid for the license. An availability table field 26 and an activity table field 27 identify license usage allocation unit value tables in the license unit tables 12 (described below in connection with FIG. 3) to be used in connection with the GRANT LICENSE and RELEASE LICENSE requests.

By way of background, a license may be in accordance with a licensing paradigm which requires concurrent use of the licensed program 14 on several processors to be a function of the processor power and capacity, and the availability table field 26 identifies a license usage allocation unit table to be used in connection with that. In an alternative, a license may be in accordance with a licensing paradigm which requires concurrent use of the licensed program to be a function of the number of users using the program, and the activity table field 27 identifies a license usage allocation unit value table in the license unit tables 12 to be used in connection with that. If either licensing paradigm is used to the exclusion of the other, one field contains a non-zero value and the other field contains a zero value. In addition, a license may be in accordance with both licensing paradigms, that is, concurrent use of a program may be limited both by processor power and capacity and by the number of concurrent users, and in that case both fields 26 and 27 have non-zero values.

In one embodiment of the licensing management system, fields 21 through 27 of an entry 20 in the licensing data base 11 are required. In that embodiment, an entry 20 in the licensing data may also have several optional fields. In particular, an entry 20 may include a date/version number field 30 whose contents comprise either a date or version number to identify the licensed program. If a license is to terminate on a specific date, the entry 20 may include a licensor termination date field 31 or a licensee termination date field 32 whose contents specify the termination date assigned by the licensor or licensee. This may be particularly useful, for example, as a mechanism for permitting licensees to demonstrate or try a program before committing to a long or open term license.

Finally, an entry 20 in the license data base includes a checksum field 33, which includes a checksum of the contents of the other fields 21 through 27 and 30 through 32 in the entry 20, which may be established by means of a mathematical algorithm applied to the contents of the various fields. The general mechanism for establishing checksums is well known in the art, and will not be described further herein. The contents of all fields 21 through 27 and 30 through 33 of a new entry 20 are entered by an operator. Prior to establishment of an entry in the license data base 11, the license management facility 10 may verify correct entry of the information in the various fields by calculating a checksum and comparing it to the checksum provided by the operator. If the checksum provided by the operator and the checksum determined by the license management facility are the same, the entry 20 is established in the license data base 11. On the other hand, if the checksum provided by the operator and the checksum determined by the license management facility differ, the license management facility 10 determines that the information is erroneous or the license is invalid and does not establish the entry 20 in the license data base 11. It will be appreciated that, if the checksum-generation algorithm is hidden from an operator, the checksum provides a mechanism for verifying, not only that the information has been properly loaded into the entry, but also that the license upon which the entry is based is authorized by the licensor.

The structure of group license tables 17 may be similar to the structure of the license data base 11, with the addition that the entries for each license reflected in the group license tables 17 will need to identify all of the licensed programs covered thereby.

Figure 3:
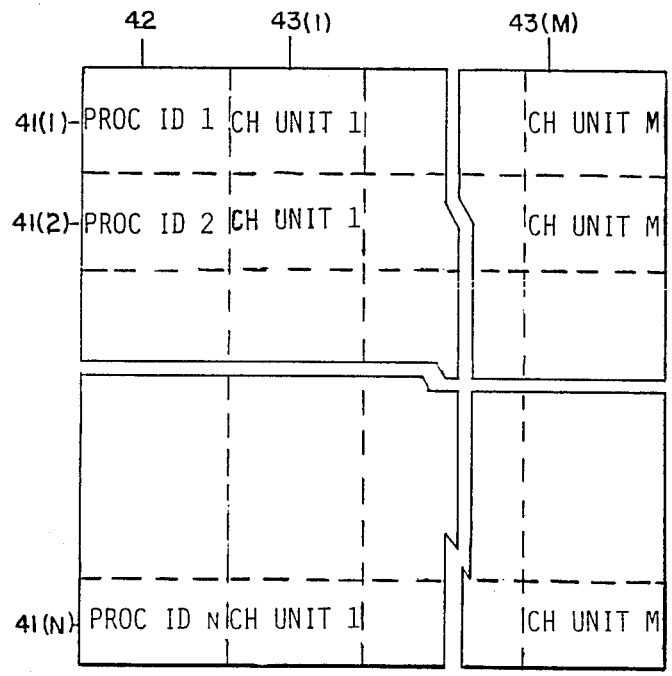

As described above, the licensing unit tables 12 (FIG. 1) contain information as to the allocation units for use in determining the number of licensing units associated with use of a licensed program. The structure of a licensing unit table 40 is depicted in FIG. 3. With reference to FIG. 3, the licensing unit table includes a plurality of entries 41(1) through 41(N) (generally identified by reference numeral 41) each identified by a particular type of processor. One entry 41 in the table 40 is provided for each type of processor which can be included in the digital data processing system which can use the licensed programs 14 which reference the license unit table 40. The processor associated with each entry is identified by a processor identification field 42.

The successive fields in the entries 41 (which form the various columns in the table 40 depicted in FIG. 3) form license usage allocation unit value tables 43(1) through 43(M) (generally identified by reference numeral 43) The contents of the availability table field 26 and the activity table field 27 identify a license usage allocation unit value table 43. If there are non-zero contents in both availability field 26 and activity field 27, the contents which identify be the same license usage allocation unit value table 43 or different license usage allocation unit value tables 43. As described above, the contents of the license usage allocation unit value table identify the number of licensing units associated with use of the licensed programs which identify the particular license usage allocation unit value table, for each of the identified processors.

Figures 2, 4A:
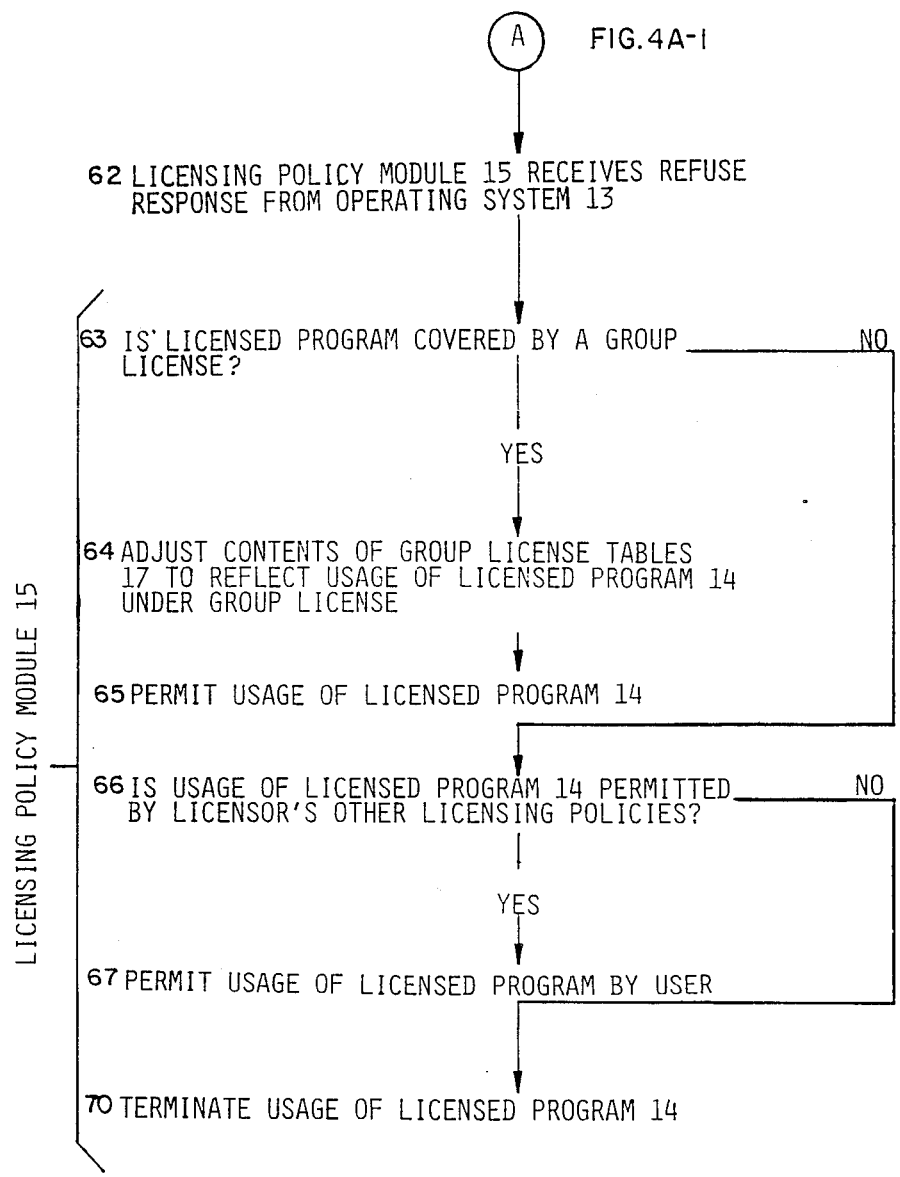
Figures 3, 4A:
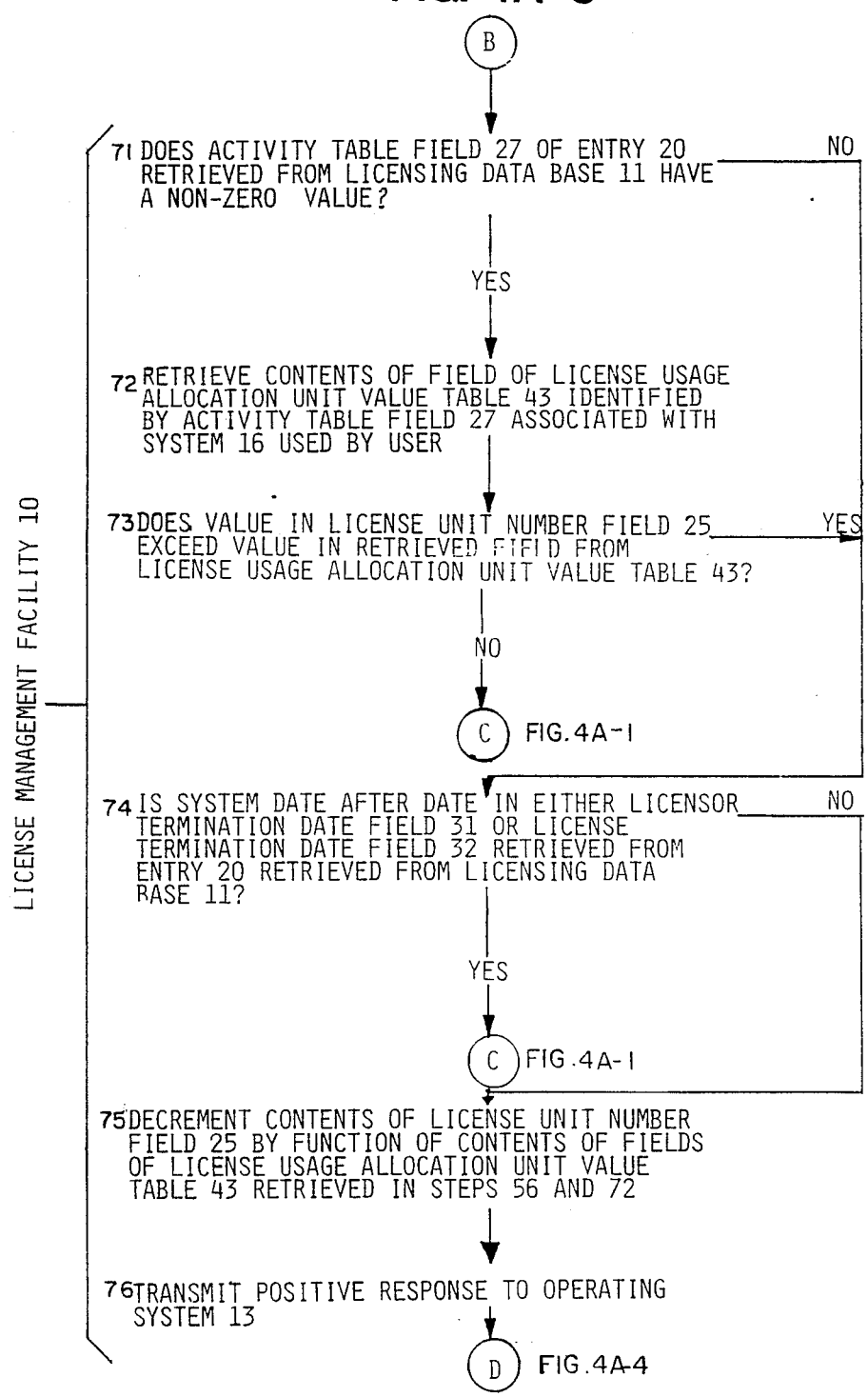
Figures 2, 4B:
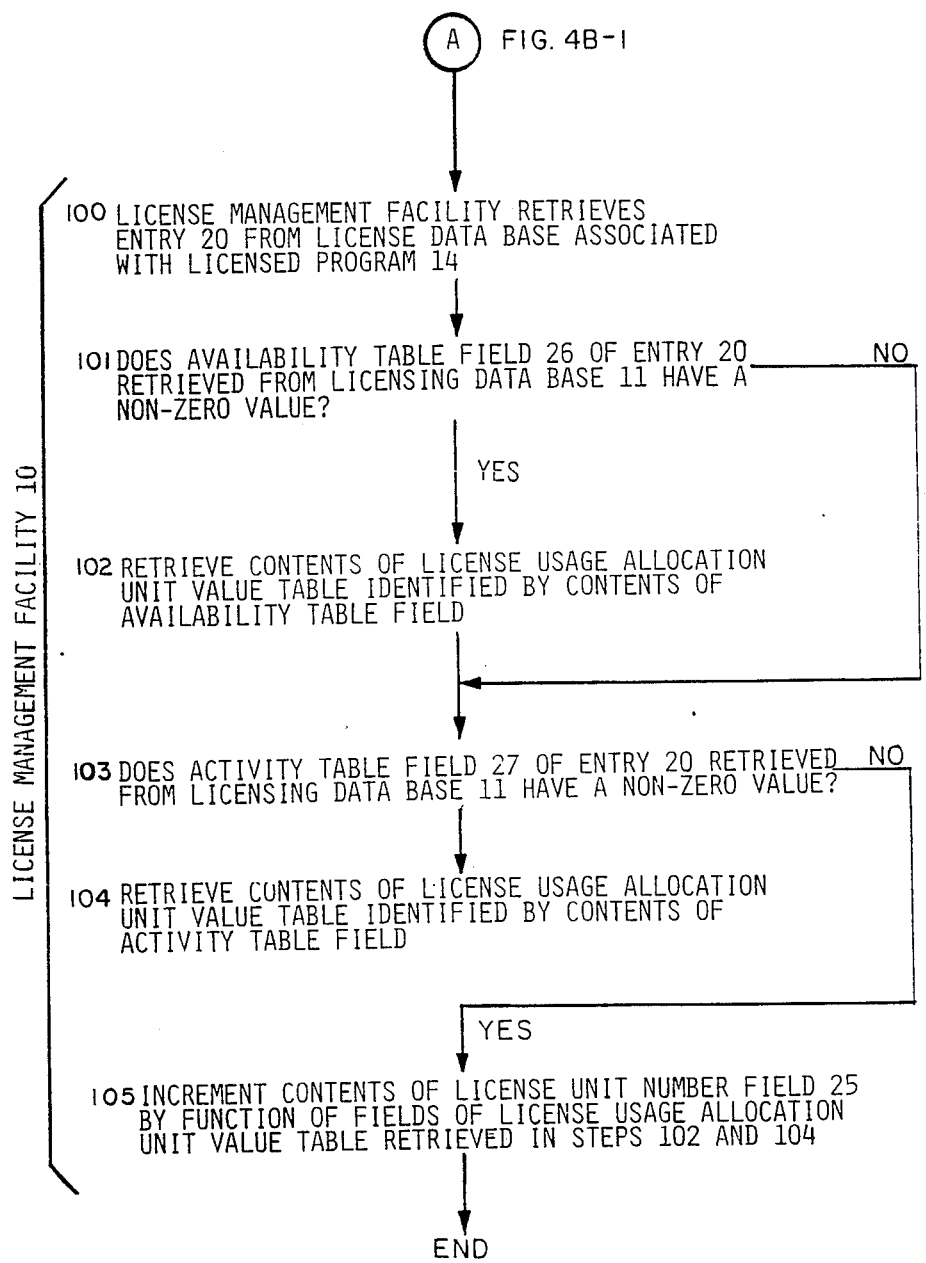

The operation of the licensing management system is depicted in detail in FIGS. 4A-1 through 4B. FIGS. 4A-1 through 4A-4 depict, in a number of steps the details of operation of the licensing management system in connection with the GRANT LICENSE request from a licensed program 14. FIGS. 4B-1 and 4B-2 depict, in a number of steps, the details of operation in connection with the RELEASE LICENSE request from a licensed program 14. In the Figs., the particular steps performed by the licensing policy module 15, the license management facility 10 and the operating system 13 are indicated in the respective steps. Since the operations depicted in FIGS. 4A-1 through 4B-2 are substantially as described above in connection with FIG. 1, they will not be described further herein.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A license management system for managing usage of a licensed software program comprising:
   A. licensing storage means for storing a licensing unit value identifying a number of licensing units associated with the licensed software program;
   B. usage allocation value storage means for storing a usage allocation value identifying a number of licensing units associated with a use of the licensed software program; and
   C. licensing verification means responsive to a usage request to use said licensed software program for determining, based on the contents of said licensing storage means and said usage allocation value storage means, whether usage of said licensed software program is permitted and, if usage is permitted, for adjusting the contents of said licensing storage means by a value related to the contents of said usage allocation value storage means.

2. A license management system as defined in claim 1 for use in a digital data processing system which generates a system date value, said licensing storage means includes a plurality of fields including a licensing unit storage field for storing said licensing unit number identifying value and a field identifying a termination date, said licensing verification means further determining whether usage of said licensed software program is permitted in response to a comparison of said system date and said termination date.

3. A license management system as defined in claim 1 for managing usage of a plurality of licensed software programs, wherein said licensing storage means includes a plurality of entries each containing a program identification field identifying a licensed software program and a licensing unit storage field for storing said licensing unit value, said licensing verification means including:
   A. request receiving means for receiving a usage request identifying a licensed software program;
   B. licensing unit retrieval means responsive to said request receiving means receipt of a usage request for retrieving the contents of said licensing unit storage field from the entry of said licensing storage means whose program identification field identifies the licensed software program identified in said usage request; and C. licensing unit processing means for determining, based on the contents of retrieved licensing unit storage field and said usage allocation value storage means, whether usage of said licensed software program is permitted and, if usage is permitted, for adjusting the contents of said licensing storage means by a value related to the contents of said usage allocation value storage means.

4. A license management system as defined in claim 3 for use in a digital data processing system which generates a system date value, each entry in said licensing storage means further including a termination date field identifying a termination date, said licensing unit processing means further determining whether usage of said licensed software program is permitted in response to a comparison of said system date and said termination date.

5. A license management system as defined in claim 3 wherein said usage allocation value storage means includes a plurality of usage allocation tables each storing a value identifying a number of licensing units, each entry in said licensing storage means further including a usage allocation table identification field identifying a usage allocation table, said licensing verification means further including usage allocation table retrieval means responsive to said request receiving means receipt of a usage request for retrieving the contents of the usage allocation table identified by the contents of said usage allocation table identification field of said retrieved entry, said licensing unit processing means using said retrieved usage allocation table in its determination.

6. A license management system as defined in claim 5 wherein a request message further includes licensing usage allocation value selection criteria and each usage allocation table includes a plurality of entries each identifying a usage allocation value associated with a licensing usage allocation value selection criterion, said licensing verification means including means for retrieving, from the usage allocation table identified by said entry in said licensing storage means, the usage allocation value associated with the licensing usage allocation value selection criterion in said request message and using said retrieved usage allocation value in its determination.

7. A license management system as defined in claim 3 wherein a request message further includes licensing usage allocation value selection criteria and said usage allocation table includes a plurality of entries each identifying a usage allocation value associated with a licensing usage allocation selection criterion, said licensing verification means including means for retrieving the usage allocation value associated with the licensing usage allocation selection criterion in said request message and using said retrieved usage allocation value in its determination.

8. A license management system as defined in claim 1 wherein said licensing verification means further operates in response to a release request message for adjusting the contents of said licensing storage means by a value related to the contents of said usage allocation value storage means.

9. A license management system as defined in claim 8 for managing usage of a plurality of licensed software programs, wherein said licensing storage means includes a plurality of entries each containing a program identification field identifying a licensed software program and a licensing unit storage field for storing said licensing unit value, said licensing verification means including:

A. request receiving means for receiving a release request identifying a licensed software program;

B. licensing unit processing means for adjusting the contents of said licensing storage means by a value related to the contents of said usage allocation value storage means.

10. A license management system as defined in claim 9 wherein said usage allocation value storage means includes a plurality of usage allocation tables each storing a value identifying a number of licensing units, each entry in said licensing storage means further including a usage allocation table identification field identifying a usage allocation table, said licensing verification means further including usage allocation table retrieval means responsive to said request receiving means receipt of a usage request for retrieving the contents of the usage allocation table identified by the contents of said usage allocation table identification field of said retrieved entry, said licensing unit processing means using said retrieved usage allocation table in its adjusting.

11. A license management system as defined in claim 10 wherein a release message further includes licensing usage allocation value selection criteria and each usage allocation table includes a plurality of entries each identifying a usage allocation value associated with a licensing usage allocation value selection criterion, said licensing verification means including means for retrieving, from the usage allocation table identified by said entry in said licensing storage means, the usage allocation value associated with the licensing usage allocation value selection criterion in said request message and using said retrieved usage allocation value in its adjusting.

12. A license management system as defined in claim 8 wherein a release message further includes licensing usage allocation value selection criteria and each usage allocation table includes a plurality of entries each identifying a usage allocation value associated with a licensing usage allocation value selection criterion, said licensing verification means including means for retrieving, from the usage allocation value table identified by said entry in said licensing storage means, the usage allocation value associated with the licensing usage allocation value selection criterion in said request message and using said retrieved usage allocation value in its adjusting.

13. A license management system for use in a digital data processing system including a system date generating means for generating a system date value, said license management system comprising:

A. licensing storage means including a plurality of entries each associated with a licensed software program, each entry containing a licensing units field for storing a licensing unit value identifying a number of licensing units associated with the licensed software program, a usage allocation table identification field for identifying a usage allocation table, and a termination date;

B. usage allocation table storage means for storing a plurality of usage allocation tables, each usage allocation table having a plurality of usage allocation entries each usage allocation entry being associated with a licensing usage allocation value selection criterion and storing a usage allocation value identifying a number of licensing units; and C. licensing verification means including:
  i. usage grant means including:
   a. usage request message receiving means for receiving a usage request message from a licensed software program, said usage request message identifying said licensed software program and usage grant criteria;
   b. entry retrieval means responsive to the receipt of a usage request message for retrieving from said licensing storage means the licensing table entry associated with said licensed software program;
   c. usage allocation table retrieval means for retrieving from said usage allocation table storage means a usage allocation entry identified by said retrieved licensing table entry and the licensing usage allocation value selection criterion identified by the received usage request message;
   d. licensing request processing means including:
      (I) usage determination means including licensing unit comparing means for comparing the contents of said licensing units field and said usage allocation units field and date comparison means for comparing the system date value with the contents of said termination date field to determine whether usage of said licensed software program is permitted
      (II) response generation means for generating a message in response to the determination by said usage determination means; and
      (III) licensing unit adjusting means for adjusting the contents of said licensing units field in response to a positive determination by said usage determination means;
  ii. usage release means including:
   a. usage release message receiving means for receiving a usage request message from a licensed software program, said usage request message identifying said licensed software program and usage grant criteria;
   b. entry retrieval means responsive to the receipt of a usage request message for retrieving from said licensing storage means the licensing table entry associated with said licensed software program;
   c. usage allocation table retrieval means for retrieving from said usage allocation table storage means a usage allocation entry identified by said retrieved licensing table entry and the licensing usage allocation value selection criterion identified by the received usage request message;
   d. licensing release processing means for adjusting the contents of said licensing units field in relation to the value of said usage allocation entry.

* * * * *